United States Patent
Inami et al.

(10) Patent No.: US 11,629,755 B2
(45) Date of Patent: Apr. 18, 2023

(54) SLIDING MEMBER

(71) Applicant: DAIDO METAL COMPANY LTD., Aichi (JP)

(72) Inventors: Shigeru Inami, Nuyama (JP); Erina Yasuda, Nuyama (JP); Kenji Nimura, Nuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 253 days.

(21) Appl. No.: 17/178,662

(22) Filed: Feb. 18, 2021

(65) Prior Publication Data
US 2021/0301872 A1    Sep. 30, 2021

(30) Foreign Application Priority Data

Mar. 26, 2020   (JP) .............................. JP2020-055998

(51) Int. Cl.
*F16C 33/12* (2006.01)
*F16C 17/02* (2006.01)
*F16C 33/10* (2006.01)

(52) U.S. Cl.
CPC ............ *F16C 33/122* (2013.01); *F16C 17/02* (2013.01); *F16C 33/1095* (2013.01); *F16C 33/124* (2013.01); *F16C 33/125* (2013.01); *F16C 2240/54* (2013.01); *F16C 2240/90* (2013.01)

(58) Field of Classification Search
CPC .... F16C 33/122; F16C 33/124; F16C 33/125; F16C 33/1095; F16C 17/02; F16C 2240/54; F16C 2240/90
See application file for complete search history.

(56) References Cited

U.S. PATENT DOCUMENTS

| | | |
|---|---|---|
| 2010/0104858 A1 | 4/2010 | Horio et al. |
| 2010/0253006 A1 | 10/2010 | Ishikawa et al. |
| 2010/0319647 A1 | 12/2010 | Ogawa et al. |
| 2015/0204383 A1* | 7/2015 | Ishii ................ F16H 25/24 264/267 |
| 2021/0078377 A1* | 3/2021 | Schuessler ............ F16F 1/3732 |
| 2021/0156428 A1* | 5/2021 | Kokubun .............. F16C 33/585 |
| 2022/0196065 A1* | 6/2022 | Chishima ............. F16C 19/364 |

FOREIGN PATENT DOCUMENTS

| | | |
|---|---|---|
| CN | 101807015 A | 8/2010 |
| CN | 104321550 A | 1/2015 |
| CN | 105452637 A | 3/2016 |
| CN | 109578438 A | 4/2019 |
| CN | 110307253 A | 10/2019 |

(Continued)

OTHER PUBLICATIONS

Chinese Office Action dated Aug. 11, 2022, for Chinese Patent Application No. 202110261292.4.

*Primary Examiner* — Alan B Waits
(74) *Attorney, Agent, or Firm* — Karceski IP Law, PLLC (57) ABSTRACT

A sliding member includes a resin overlay layer on a sliding surface side coming into sliding contact with a mating member. The resin overlay layer has a surface roughness parameter Rk satisfying $0.4 \leq Rk \leq 1.2$, and a surface area ratio $S=S2/S1$ calculated when an area of an arbitrary measurement field of view is designated by S1 and a surface area of the measurement field of view is designated by S2 satisfies $2.5 \leq S \leq 4.5$.

4 Claims, 6 Drawing Sheets

(56) References Cited

FOREIGN PATENT DOCUMENTS

| | | | |
|---|---:|---|---|
| CN | 110857460 A | 3/2020 | |
| DE | 102016013932 A1 | 5/2018 | |
| DE | 102018101070 A1 | 7/2019 | |
| JP | 2001349411 A | 12/2001 | |
| JP | 2006275269 A | 10/2006 | |
| JP | 2006328463 A | 12/2006 | |
| JP | 2009195935 A | 9/2009 | |
| JP | 2012047276 A | 3/2012 | |
| JP | 4926351 B2 * | 5/2012 | ............. B24B 37/04 |
| JP | 2013002340 A | 1/2013 | |
| JP | 2017082977 A | 5/2017 | |
| TW | I610041 B | 1/2018 | |
| WO | 2014157048 A1 | 10/2014 | |
| WO | 2019141775 A1 | 7/2019 | |
| WO | 2020022032 A1 | 1/2020 | |

\* cited by examiner

| ITEM | CONDITION | UNIT |
|---|---|---|
| SAMPLE SIZE | φ56 × L15 | mm |
| SAMPLE THICKNESS | 1.5 | mm |
| VIBRATION FREQUENCY | 19,000 | Hz |
| OUTPUT | 600.0 | W |
| MEDIUM | WATER | — |
| MEDIUM TEMPERATURE | 10~20 | °C |
| HORN DIAMETER | 10.0 | mm |
| DISTANCE | 0.25 | mm |
| TEST TIME | 10.0 | SEC./ONCE |

Fig.6

| | Rk | S | SOLID LUBRICANT | FLUORORESIN | NUMBER OF TIMES OF TEST |
|---|---|---|---|---|---|
| | μm | — | vol% | vol% | NUMBER OF TIMES |
| EXAMPLE1 | 0.4 | 2.5 | 40 | 0 | 2 |
| EXAMPLE2 | 1.2 | 4.5 | 60 | 0 | 2 |
| EXAMPLE3 | 0.6 | 2.5 | 50 | 0 | 3 |
| EXAMPLE4 | 0.8 | 3.5 | 40 | 0 | 4 |
| EXAMPLE5 | 1.0 | 4.5 | 60 | 0 | 3 |
| EXAMPLE6 | 0.6 | 2.5 | 5.0 | 0 | 6 |
| EXAMPLE7 | 0.8 | 3.5 | 15 | 0 | 7 |
| EXAMPLE8 | 1.0 | 4.5 | 30 | 0 | 5 |
| EXAMPLE9 | 0.6 | 2.5 | 5.0 | 1.0 | 8 |
| EXAMPLE10 | 0.8 | 3.5 | 15 | 5.0 | 9 |
| EXAMPLE11 | 1.0 | 4.5 | 30 | 15 | 7 |
| COMPARATIVE EXAMPLE1 | 0.3 | 1.5 | 40 | — | 0 |
| COMPARATIVE EXAMPLE2 | 1.5 | 5.5 | 40 | — | 0 |
| COMPARATIVE EXAMPLE3 | 0.3 | 3.5 | 40 | — | 0 |
| COMPARATIVE EXAMPLE4 | 1.5 | 3.5 | 40 | — | 0 |
| COMPARATIVE EXAMPLE5 | 0.8 | 1.5 | 40 | — | 0 |
| COMPARATIVE EXAMPLE6 | 0.8 | 5.5 | 40 | — | 0 |

SLIDING MEMBER

CROSS-REFERENCE TO RELATED APPLICATION(S)

This application is based on and claims priority to Japanese Patent Application No. 2020-055998, filed on Mar. 26, 2020, the entire content of which is incorporated herein by reference.

FIELD OF THE INVENTION

The present embodiment relates to a sliding member.

DESCRIPTION OF THE RELATED ART

Conventionally, a sliding member having a resin overlay layer on a sliding surface side of a bearing alloy layer is known (see Japanese Patent Laid-Open No. 2012-47276). If bubbles are generated in lubricating oil when such a resin overlay layer comes into sliding contact with a mating member, the resin overlay layer suffers an impact force when the bubbles burst. This impact force causes so-called cavitation damage such as exfoliation of the resin overlay layer from the bearing alloy layer. Japanese Patent Laid-Open No. 2012-47276 uses a resin overlay layer containing a solid lubricant to reduce the cavitation damage.

However, as the performance of a device to which the sliding member is applied is further improved, bubbles in the lubricating oil are more likely to be generated. Therefore, there is a problem that such a countermeasure as taken in Japanese Patent Laid-Open No. 2012-47276 is insufficient to reduce the cavitation damage.

Therefore, it is an object of the present invention to provide a sliding member which reduces an impact force to be suffered when bubbles burst by controlling the sizes of the bubbles, thereby reducing the cavitation damage.

SUMMARY OF THE INVENTION

In order to attain the above object, a sliding member of an embodiment includes a resin overlay layer on a sliding surface side coming into sliding contact with a mating member. The resin overlay layer has a surface roughness parameter Rk satisfying $0.4 \leq Rk \leq 1.2$, and a surface area ratio $S=S2/S1$ calculated when an area of an arbitrary measurement field of view is designated by S1 and a surface area of the measurement field of view is designated by S2 satisfies $2.5 \leq S \leq 4.5$.

The inventor has found that the size of bubbles generated during sliding contact correlates with the roughness parameter Rk and the surface area ratio S of the resin overlay layer, and the effect on cavitation damage changes. In other words, the inventor has found that the cavitation damage is more greatly reduced in the case of a single relatively large bubble rather than that in the case of a large number of fine bubbles when the total volume of the bubbles is the same. As a result, the roughness parameter Rk and the surface area ratio S of the resin overlay layer are controlled to guide the size of the bubbles generated during sliding contact to a larger size side, whereby the cavitation damage is reduced. In the present embodiment, by controlling the roughness parameter Rk and the surface area ratio S as described above, the bubbles become larger and the impact force that the resin overlay layer suffers when the bubbles burst is reduced. Therefore, cavitation damage can be reduced.

DETAILED DESCRIPTION OF THE PREFERRED EMBODIMENTS

An embodiment of a sliding member will be described with reference to the drawings.

Figure 1:
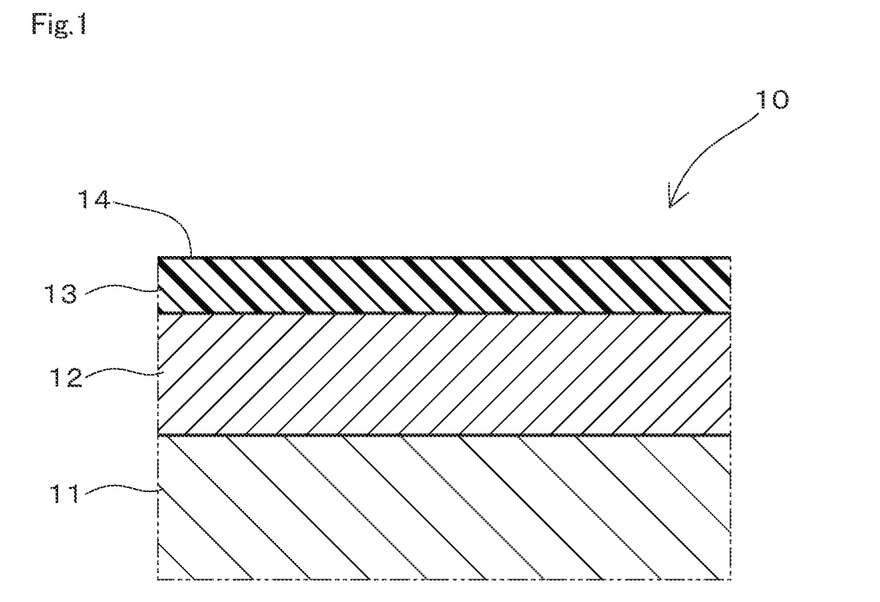
FIG. 1 is a schematic diagram showing a cross-section of a sliding member according to an embodiment.

As shown in FIG. 1, a sliding member 10 includes a back metal layer 11, a bearing alloy layer 12, and a resin overlay layer 13. The sliding member 10 may include an intermediate layer (not shown) between the back metal layer 11 and the bearing alloy layer 12. Further, the sliding member 10 is not limited to the example shown in FIG. 1, and it may include a plurality of bearing alloy layers 12 or intermediate layers, and other layers having other functions between the back metal layer 11 and the resin overlay layer 13. The sliding member 10 forms a sliding surface 14 coming into sliding contact with a mating member at an end portion on the resin overlay layer 13 side. In the case of the present embodiment shown in FIG. 1, the sliding member 10 is configured so that the bearing alloy layer 12 and the resin overlay layer 13 are laminated in turn on the sliding surface 14 side of the back metal layer 11. The back metal layer 11 is formed of, for example, a metal or alloy such as iron or steel. The bearing alloy layer 12 is formed of, for example, Al or Cu, or an alloy thereof.

The resin overlay layer 13 is composed of a resin binder and a solid lubricant (not shown). The resin binder is a main component of the resin overlay layer 13, and it includes, for example, one or more components selected from the group consisting of polyamideimide, polyimide, polybenzimidazole, polyamide, epoxy resin, phenol resin, polyacetal, polyetheretherketone, polyethylene, polyphenylene sulfide, polyetherimide, a fluororesin, and an elastomer resin. Further, the resin binder may be a polymer alloy. In the present embodiment, polyamideimide is used as the resin binder. Further, for example, an inorganic compound, a fluororesin or the like is used as the solid lubricant. The inorganic compound includes, for example, one or more components selected from the group consisting of molybdenum disulfide, tungsten disulfide, h-BN, graphite fluoride, graphite, mica, talc, melamine cyanurate and the like. For example, polytetrafluoroethylene (PTFE) or the like is used as the fluororesin. In the case of the present embodiment, the resin overlay layer 13 contains 5 vol % to 30 vol % of the solid lubricant. The solid lubricant contained in the resin overlay layer 13 preferably contains 1 vol % to 15 vol % of a fluororesin such as PTFE of.

An additive such as a filler may be added to the resin overlay layer 13. In this case, the additive includes one or more components selected from the group consisting of calcium fluoride, calcium carbonate, calcium phosphate, an oxide such as iron oxide, aluminum oxide, chromium oxide, cerium oxide, zirconium oxide, titanium oxide, silicon oxide, or magnesium oxide, a carbide such as molybdenum carbide or silicon carbide, aluminum nitride, silicon nitride, cubic boron nitride, diamond and the like.

With respect to the resin overlay layer 13 of the present embodiment, the surface roughness parameter Rk of the resin overlay layer 13 satisfies $0.4 \leq Rk \leq 1.2$. The surface of the resin overlay layer 13 coincides with the sliding surface 14 before the resin overlay layer 13 has worn. Further, it is more preferable that the roughness parameter Rk of the resin overlay layer 13 satisfies $0.6 \leq Rk \leq 1.0$. In this case, for the roughness parameter Rk, a cutoff value is set to 0.08.

Figure 2:
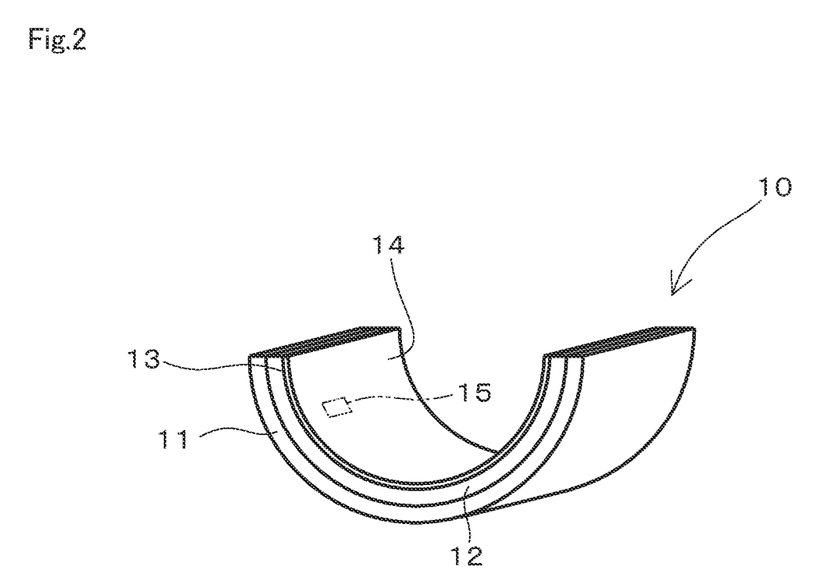
FIG. 2 is a schematic perspective view showing the sliding member according to the embodiment.

With respect to the resin overlay layer 13 of the present embodiment, a surface area ratio S of the surface of the resin overlay layer 13 is $2.5 \leq S \leq 4.5$. Here, the surface area ratio S is defined as follows. As shown in FIG. 2, an arbitrary measurement field of view 15 is set on the sliding surface 14 which is the surface of the resin overlay layer 13. A projected area of this measurement field of view 15 is defined as S1. Further, a surface area when unevenness of the sliding surface 14 in the measurement field of view 15 is considered is measured, and this surface area is defined as S2. From the thus-obtained projected area S1 and surface area S2 in the measurement field of view 15, the surface area ratio S is calculated as $S=S2/S1$. In the case of the present embodiment, the projected area S1 and the surface area S2 in the measurement field of view 15 are measured by using a laser microscope, and the surface area ratio S is calculated by using the measured projected area S1 and surface area S2.

Next, a method of manufacturing the sliding member 10 having the above configuration will be described.

Figure 3:
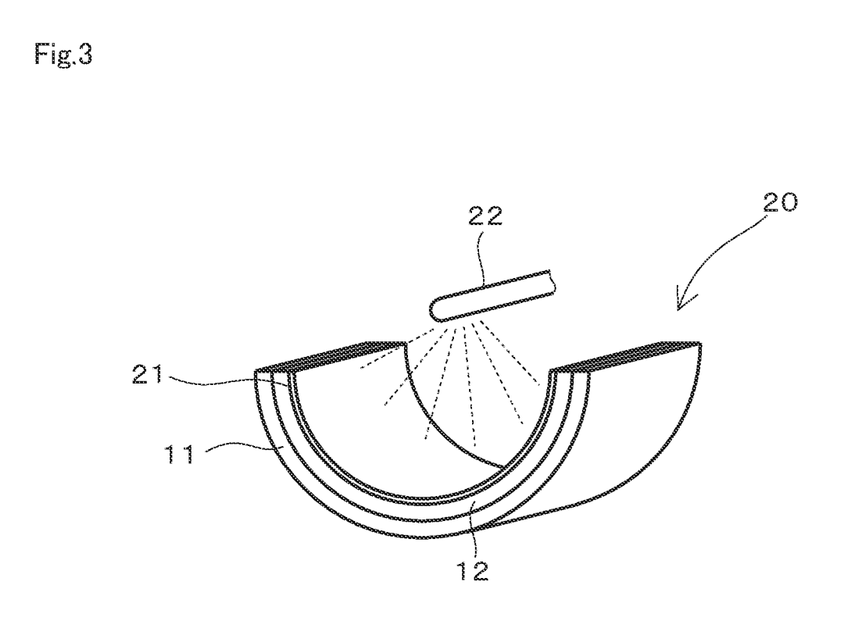
FIG. 3 is a schematic perspective view showing a method of manufacturing the sliding member according to the embodiment.

As shown in FIG. 3, a bimetal 20 in which the bearing alloy layer 12 is formed on one surface side of the back metal layer 11 is formed in a semi-cylindrical shape. In this case, the bimetal 20 may be formed by making the back metal layer 11 into a semi-cylindrical shape and then forming the bearing alloy layer 12 on the inner peripheral side. The shape of the bimetal 20 is not limited to the semi-cylindrical shape, and may be a cylindrical shape or a shape obtained by dividing a cylinder into a plurality of parts in the circumferential direction.

In the bimetal 20, a resin material 21 which will be the resin overlay layer 13 is coated on the surface of the bearing alloy layer 12. The resin material 21 is a suspension mixture in which the resin binder and the solid lubricant constituting the resin overlay layer 13 are suspended in a solvent. In this case, the suspended resin material 21 which will be the resin overlay layer 13 is sprayed from a spray 22 arranged at a position facing the bearing alloy layer 12 of the bimetal 20 to be coated onto the surface of the bearing alloy layer 12. In place of this coating manner, the resin material 21 may be coated onto the surface of the bearing alloy layer 12 by an arbitrary coating manner such as a roll, a pad, or a screen. The coated resin material 21 is dried by a heat source (not shown) so that only an outermost surface of the coated resin material 21 which is located on an opposite side to the bearing alloy layer 12 is rapidly dried in a short time of about several seconds. For example, an infrared ray source or the like is used as the heat source. By rapidly drying only the outermost surface of the thus-coated resin material 21, the roughness parameter Rk and the surface area ratio S of the surface of the thus-formed resin overlay layer 13 are controlled to desired values. Note that the bimetal 20 may be made into a cylindrical shape or semi-cylindrical shape after the resin overlay layer 13 is formed from the resin material 21 while the bimetal 20 keeps a flat-plate shape.

As described above, after the resin material 21 is coated onto the bimetal 20 and the outermost surface is dried, the whole of the resin material 21 is dried, thereby forming the sliding member 10 including the resin overlay layer 13.

Examples of the sliding member 10 according to the present embodiment will be hereinafter described while the examples are compared with comparative examples.

Figure 4:
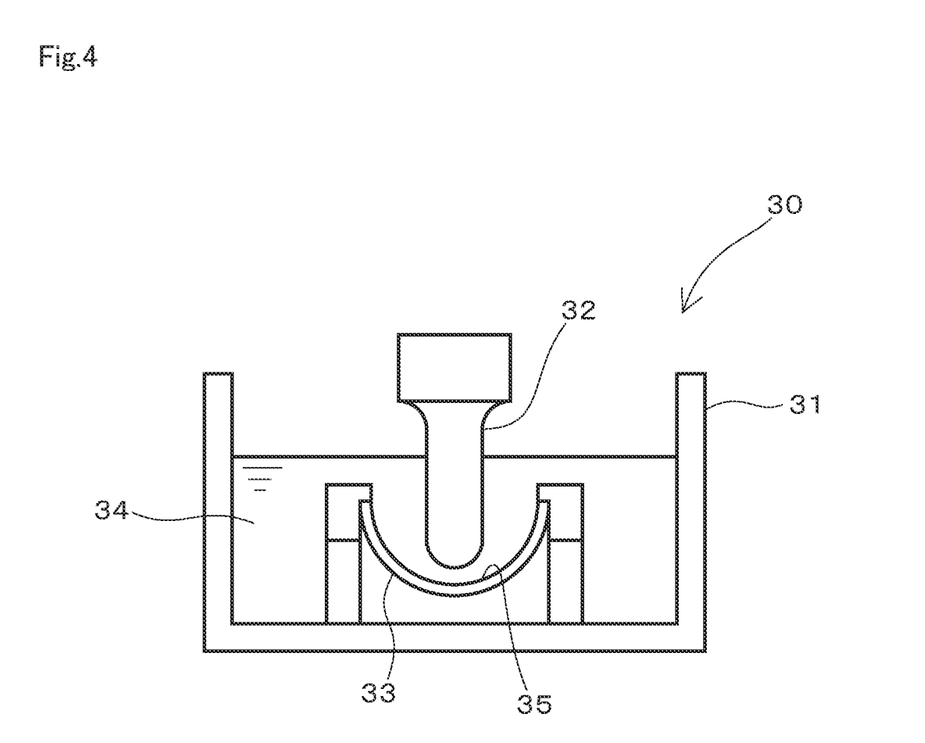
FIG. 4 is a schematic diagram showing a testing machine of the sliding member according to the embodiment.
Figure 5:
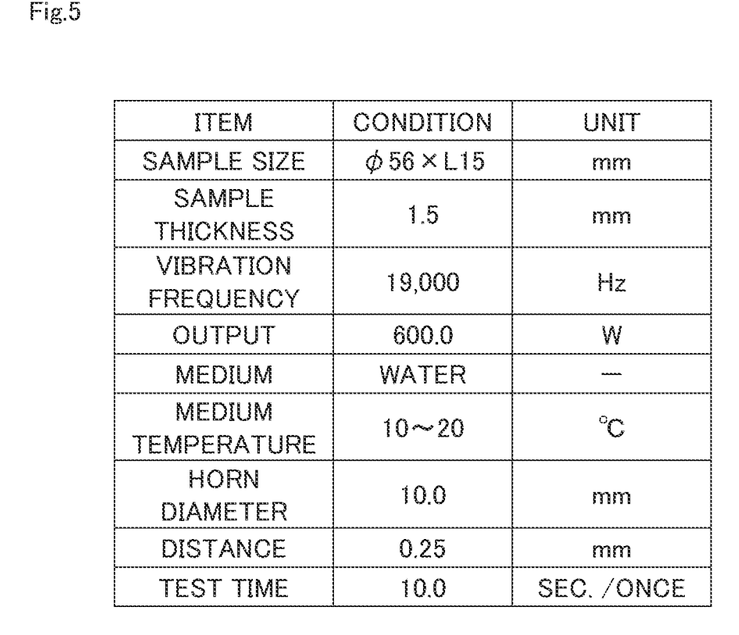
FIG. 5 is a schematic diagram showing a test condition for the sliding member according to the embodiment.

Samples of the examples and comparative examples of the sliding member 10 manufactured by the above-mentioned procedure were tested by using a testing machine 30 as shown in FIG. 4 under a condition shown in FIG. 5. The test was evaluated based on whether the resin overlay layer 13 of the sliding member 10 was exfoliated or not. Specifically, the testing machine 30 shown in FIG. 4 includes a water tank 31 and a horn 32. A sample 33 of the sliding member was placed in the water tank 31 filled with water 34, and an ultrasonic wave was irradiated from the horn 32 to a position corresponding to the sliding surface 35. The distance from the horn 32 to the sample 33 was set to 0.25 mm. In this testing machine 30, the sample 33 was irradiated with an ultrasonic wave of 19,000 Hz for 10 seconds each time. The evaluation of the sample 33 was carried out by confirming whether the resin overlay layer 13 of the sample 33 was exfoliated and based on the number of times of the test performed until the resin overlay layer 13 was exfoliated. The test condition shown in FIG. 5 is set such that the distance between the horn 32 and the sliding surface 35 is smaller and the number of times generated bubbles burst increases in order to make more severe an influence on the sliding member 10 under the test condition than an influence on the sliding member 10 by bubbles generated under an actual usage condition. In other words, this test condition corresponds to an accelerated test for confirming an effect on the bursting of bubbles.

Figure 6:
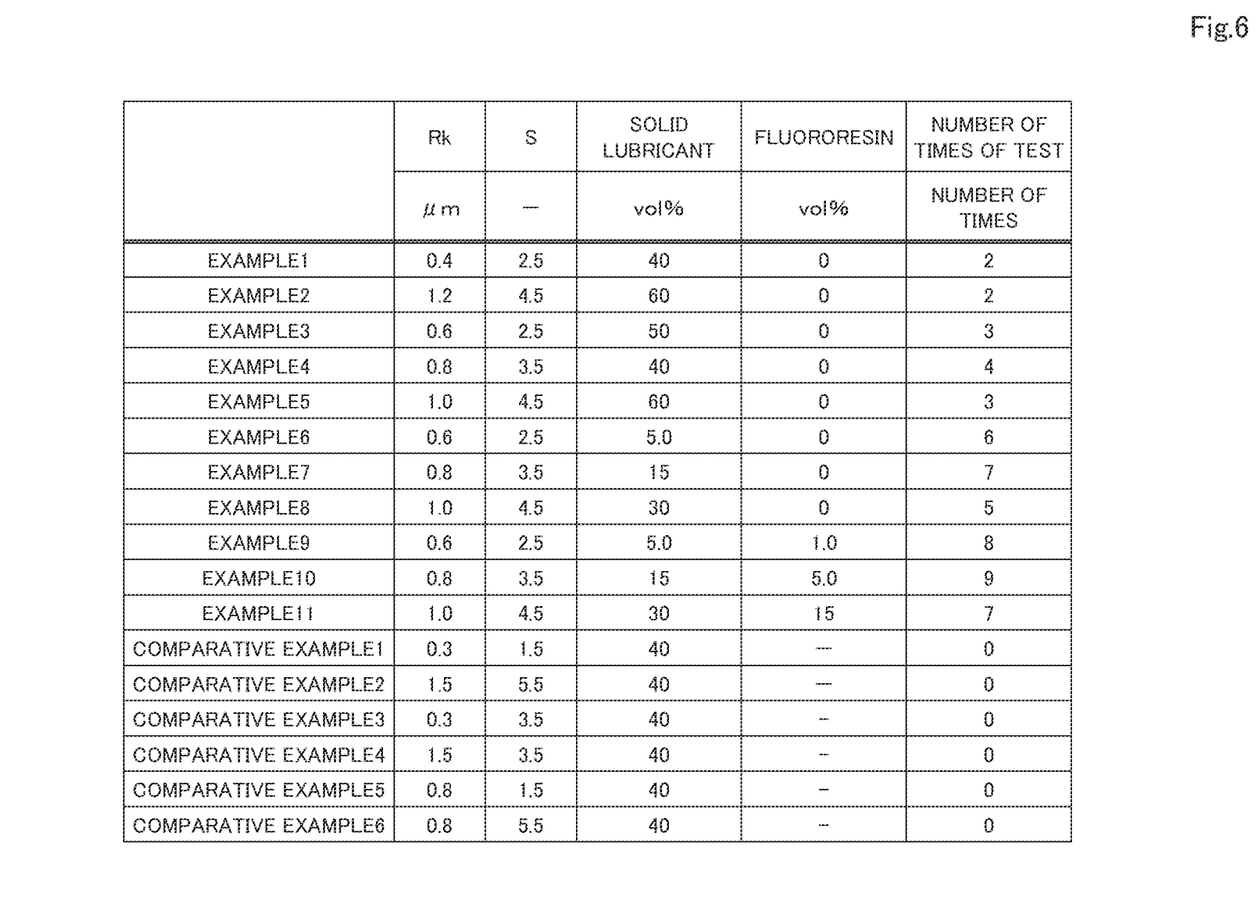
FIG. 6 is a schematic diagram showing test results of an example and a comparative example of the sliding member according to the embodiment.

As shown in FIG. 6, as compared with Comparative Examples 1 to 6 which do not satisfy the roughness parameters Rk and the surface area ratio S, in Examples 1 to 11 satisfying the roughness parameter Rk and the surface area ratio S, the number of times of the test performed until the resin overlay layer 13 is exfoliated increases. In other words, in Examples 1 to 11, the number of times of the test performed until the resin overlay layer 13 is exfoliated increases even under severe conditions as described above. On the other hand, in the cases of Comparative Examples 1 to 6, the resin overlay layer 13 is exfoliated in all cases. From these results, it can be seen that the cavitation damage of the resin overlay layer 13 is reduced by controlling the roughness parameter Rk and the surface area ratio S. Specifically, the resin overlay layer 13 has reduced the cavitation damage when the roughness parameter Rk satisfies $0.4 \leq Rk \leq 1.2$ and the surface area ratio S satisfies $2.5 \leq S \leq 4.5$.

In each of Examples 1 to 11 of the sliding member 10 according to the present embodiment, bubbles generated on the sliding surface 14 side of the resin overlay layer 13 are increased in size by controlling the roughness parameter Rk and the surface area ratio S. If the total volume of the generated bubbles is the same, a smaller number of larger bubbles have a smaller effect on the resin overlay layer 13 than a larger number of fine bubbles. This is because as the bubble is smaller, the pressure inside the bubble is higher, so that the impact force acting on the surroundings of the bubble when the bubble bursts is greater. As a result, the smaller bubbles increase the impact force acting on the resin overlay layer 13, and thus damage the resin overlay layer 13. In Examples 1 to 11 of the sliding member 10 according to the present embodiment, the bubbles generated are increased in size by controlling the surface of the resin overlay layer 13. As a result, it is considered in Examples 1 to 11 that the influence of the bubbles on the resin overlay layer 13 is reduced and the cavitation damage is reduced.

Further, according to Examples 1 to 11 and Comparative Examples 1 to 6, it can be seen that the cavitation damage of the resin overlay layer 13 cannot be reduced when only one of the roughness parameter Rk and the surface area ratio S is satisfied. From this as well, it can be seen that in order to reduce the cavitation damage of the resin overlay layer 13, it is necessary to achieve both the roughness parameter Rk and the surface area ratio S as in Examples 1 to 11 of the sliding member according to the present embodiment.

According to Examples 1 to 5, it can be seen that Examples 3 to 5 having the roughness parameter Rk satisfying $0.6 \leq Rk \leq 1.0$ can more greatly reduce the cavitation damage as compared with Examples 1 and 2. When the surface area ratio S satisfies $2.5 \leq S \leq 4.5$ and the roughness parameter Rk satisfies $0.6 \leq Rk \leq 1.0$, the generated bubbles become larger in size, which can more greatly reduce the cavitation damage of the resin overlay layer 13.

Next, when Examples 1 to 5 are compared with Examples 6 to 8, it can be seen that Examples 6 to 8 in which the resin overlay layer 13 contains 5.0 vol % to 30 vol % of a solid lubricant can more greatly reduce the cavitation damage as compared with Examples 1 to 5 in which the resin overlay layer 13 contains the solid lubricant exceeding the above range. As a result, the bubbles generated become larger in size by including an appropriate solid lubricant in the resin overlay layer 13, so that the cavitation damage of the resin overlay layer 13 can be more greatly reduced.

In particular, according to Examples 9 to 11, it can be seen that the cavitation damage can be more greatly reduced when the resin overlay layer 13 contains 5.0 vol % to 30 vol % of the solid lubricant and also contains 1.0 vol % to 15 vol % of a fluororesin as the solid lubricant. As a result, the bubbles generated are increased in size by using an appropriate amount of fluororesin as the solid lubricant contained in the resin overlay layer 13, whereby the cavitation damage of the resin overlay layer 13 can be more greatly reduced.

The present invention described above is not limited to the above-described embodiment, and can be applied to various embodiments without departing from the subject matter thereof.

What is claimed is:

1. A sliding member comprising a resin overlay layer on a sliding surface side coming into sliding contact with a mating member, wherein the resin overlay layer has a surface roughness parameter Rk satisfying $0.4 \leq Rk \leq 1.2$, and a surface area ratio $S = S1/S2$ calculated when an area of an arbitrary measurement field of view is designated by S1 and a surface area of the measurement field of view is designated by S2 satisfies $2.5 \leq S \leq 4.5$.

2. The sliding member according to claim 1, wherein the roughness parameter Rk satisfies $0.6 \leq Rk \leq 1.0$.

3. The sliding member according to claim 1, wherein the resin overlay layer contains 5.0 vol % to 30 vol % of a solid lubricant.

4. The sliding member according to claim 3, wherein the solid lubricant contains 1.0 vol % to 15 vol % of a fluorine-based resin.

\* \* \* \* \*